United States Patent Office 3,360,566
Patented Dec. 26, 1967

3,360,566
MANUFACTURE OF 2',4'-DICHLOROACETOPHE-
NONES AND BETA-POLYCHLORINATED 2',4'-
DICHLOROACETOPHENONES FROM MIXED
DICHLOROBENZENES
Jerome Linder, Niagara Falls, Edward D. Weil, Lewiston,
and Jack S. Newcomer, Wilson, N.Y., assignors to
Hooker Chemical Corporation, Niagara Falls, N.Y., a
corporation of New York
No Drawing. Filed Nov. 25, 1964, Ser. No. 413,969
9 Claims. (Cl. 260—592)

This invention comprises a novel process for the production of 2',4'-dichloroacetophenones and beta-polychlorinated 2',4'-dichloroacetophenones.

Nuclear chlorinated 2',4'-dichloroacetophenones are known compounds which can be produced by Friedel-Crafts acylation of meta-dichlorobenzene according to the equations:

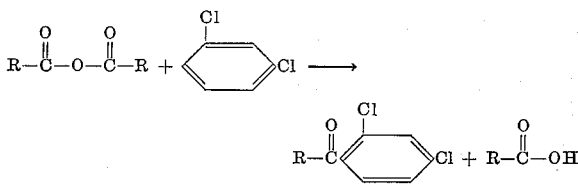

or

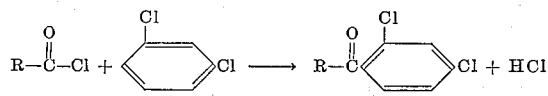

wherein R is $CH_3$, $CHCl_2$ or $CCl_3$.

However, the product which is useful for the preparation of insecticides has been costly and difficult to obtain because of the difficulty in obtaining the pure metadichlorobenzene previously required for the reaction. The dichlorination of benzene under ordinary conditions yields ortho and paradichlorobenzene and virtually no metadichlorobenzene. The chlorination of benzene under high temperature vapor phase conditions results in a mixture of dichlorobenzene isomers having up to 5 to 10 percent metadichlorobenzene, but the isolation of reasonably pure metadichlorobenzene is extremely difficult. Because of the very close boiling points (orthodichlorobenzene boils at 179 degrees, metadichlorobenzene boils at 172 degrees centigrade and paradichlorobenzene boils at 174 degrees centigrade) and the low melting point of metadichlorobenzene (minus 24.8 degrees centigrade) the separation and isolation of metadichlorobenzene is extremely difficult and in most instances impracticable. As a result of these difficulties, metadichlorobenzene has largely remained a laboratory curiosity.

In the preparation of insecticides from dichloroacetophenones, compounds of the 2',4'-dichloroacetophenone structure produce an effective insecticide, and it is desirable to have the dichloroacetophenone in a concentration of at least 90 percent of the 2',4'-dichloro isomer.

It has now been found that the preparation of 2',4'-dichloroacetophenones, including beta, beta-2',4'-tetrachloroacetophenone having the structure;

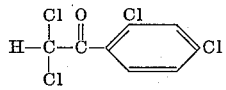

and beta, beta, beta-2',4'-pentachloroacetophenone having the structure:

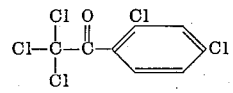

and particularly 2',4'-dichloroacetophenone having the structure;

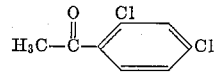

can be produced by preferential acetylation of metadichlorobenzene in the presence of the ortho and para isomers to yield the 2',4'-dichloroacetophenone isomer in a proportion exceeding the proportion of metadichlorobenzene present in the reaction mixture.

Therefore, it is an object of the present invention to provide a method of preparing 2',4'-dichloroacetophenone from a crude mixture of dichlorobenzene containing metadichlorobenzene. It is another object of this invention to provide a method of preferentially acetylating metadichlorobenzene to preferentially produce 2',4'-dichloroacetophenones. These and other objects will become apparent to those skilled in the art from the disclosure herein.

In accordance with the invention, a process is provided for the production of 2',4'-dihaloacetophenone in a proportion exceeding the proportion of metadihalobenzene in the dihalobenzene starting mixture comprising reacting a mixture of dihalobenzenes containing 20 to 85 percent metadihalobenzene isomer with an acetylating reagent, said acetylating reagent being used in an amount up to the stoichiometric equivalent based on the amount of metadihalobenzene contained in the reaction mixture and effecting the reaction in the presence of a Lewis-acid catalyst.

The present invention provides a method of obtaining the desired 2',4'-dichloroacetophenone from a crude mixture of dichlorobenzenes as well as other 2',4' dihaloacetophenone from the respective fluoro, bromo or iodo dihalobenzenes. Surprisingly, the product thus obtained comprises 90 to nearly 100 percent 2',4'-dihaloacetophenone based on the total acetophenone present. Thus, by the process of this invention, the complicated and difficult separation of the metadihalobenzene prior to acetylation can be eliminated and a practical method of producing the 2',4'-dihaloacetophenone is provided. In that the chloro compounds are the most desired commercially, the disclosure and examples herein are directed to the chlorine compounds. However, it is to be understood that halogens other than chlorine can be substituted on the benzene ring in isomeric proportions equal to those described for chlorine.

The dichlorobenzene mixture acetylated by the present invention contains 20 to 85 percent metadichlorobenzene, the remaining proportions being substantially the ortho and para dichlorobenzene isomers. Such a crude mixture of dichlorobenzenes can be obtained from benzene dichlorinated processes in which the meta isomer is formed. Vapor phase chlorination of benzene in the presence of an iron catalyst normally yields about 5 percent and occasionally as high as 10 percent meta isomer, the principal products being the ortho and para isomers. Process streams containing the meta isomers are often subjected to separation processes to purify the product so as to produce products containing primarily a preferred isomer, such as the ortho or the para isomer. Thus, eutectic mixtures of para and meta isomers can be formed such that the by-product stream results in a concentration of meta isomer in the range of 20 to 85 percent. Most frequently, by-product streams of this type do not contain the meta isomer in an amount greatly exceeding the eutectic mixture in which the meta isomer is present in about a 60 percent concentration.

To obtain the higher concentration of meta isomer, e.g., more than 80 to 85 percent, is extremely difficult, requiring numerous distillations, or columns of up to 100 or more theoretical plates.

The dichloroacetophenones of the present invention are produced by acetylating the crude dichlorobenzene mixture with acylating reagents, such as acetyl chloride and acetic anhydride. In addition, to produce a beta-polychlorinated 2′,4′-dichloroacetophenone, that is, one which contains two or three chlorines on the acetyl group, acylating reagents, such as dichloroacetyl chloride and trichloroacetyl chloride and the respective chlorinated acetic anhydrides are used.

The amount of acylating reagent used is that amount up to the stoichiometric equivalent of acylating reagent based on the amount of metadichlorobenzene in the crude mixture. Thus, the acylating reagent is preferably used in an amount equal to or less than the stoichiometric, thereby favoring reaction with the metadichlorobenzene isomer.

The reaction between metadichlorobenzene and the acylating reagent is catalyzed by Friedel-Crafts acylation catalysts. Preferably, compounds of the class known as strong Lewis acids are preferred, especially the halides of aluminum, iron, titanium, tin, antimony, zinc, boron, bismuth and the transition metals. Also, although the halides of fluorine, chlorine, and bromine readily effect the reaction, the preferred halide is chlorine. Therefore, aluminum chloride, ferric chloride, titanium chloride, tin chloride, zinc chloride, boron trichloride and the like are suitable catalysts. For reason of availability and economics, aluminum chloride is the preferred catalyst.

The catalyst is used in an amount equimolar with respect to the number of carbonyl groups in the acylating reagent. Thus, for acetyl chloride, at least one mole of aluminum chloride is used per mole of acetyl chloride. For acetic anhydride, at least two moles of aluminum chloride are used per mole of acetic anhydride. Amounts greatly exceeding the stated mole ratio can be used, but as a practical matter the catalyst is normally not used in an amount greater than about 3 moles catalyst per mole of acylating reagent based on the number of carbonyl groups.

The reaction is run at atmospheric pressures. However, pressures other than atmospheric, such as superatmospheric and subatmospheric can be employed.

The reaction is effected at temperatures in the range of about 20 degrees centigrade to about 200 degrees centigrade and more preferably between 40 degrees centigrade and 130 degrees centrigrade, in which range somewhat better selectivity of reaction with the metadichlorobenzene is observed.

Reaction time is a function of temperature. Generally, the reaction will require from about 5 minutes to about 3 days, slower reactions corresponding to lower temperatures. Because the reaction can be terminated or progress to any degree of completion, this reaction is readily adapted for use as a continuous process.

The following examples illustrate certain preferred embodiments of the invention. Unless otherwise indicated, all temperatures are in degrees centigrade and all parts and percentages are by weight.

*Example 1*

2′,4′-dichloroacetophenone was produced by the method of this invention by reacting a crude dichlorobenzene mixture with acetic anhydride. The reaction was effected by placing 145.6 parts of a crude mixture of dichlorobenzene containing 71 percent meta isomer, 22 percent para isomer, and 6.3 percent ortho isomer in a reaction vessel containing a stirring means, a thermometer, a dropping funnel and a condenser. In addition to the dichlorobenzene mixture, 89.4 parts of anhydrous aluminum chloride (AlCl₃) were added to the reaction vessel. Stirring was commenced and the reaction mixture heated to 75 degrees centigrade. To the heated mixture, 27.6 parts of acetic anhydride was added dropwise over a period of one hour.

The reaction mixture was stirred for 3.5 hours from the commencement of the acetic anhydride addition and the temperature maintained at about 75 degrees centigrade. At the end of this period, the reaction mixture was cooled and then poured onto ice. Two layers were separated. The lower layer was removed and the upper, water layer, was extracted with ether. The lower layer and the ether extraction were combined and distilled to obtain the product having a boiling point of 127 degrees centigrade at 15 millimeters of mercury pressure. The product was analyzed by infrared comparison to authenticate 2′,4′-dichloroacetophenone and found to have a purity of 95 percent. The yield was 86.5 percent calculated on acetyl chloride charged in.

*Example 2*

2′,4′-dichloroacetophenone was again prepared by reaction of a crude mixture of dichlorobenzene with acetyl chloride. A mixture of 9.85 moles of dichlorobenzene containing 71 percent meta, 6.3 percent ortho and 22 percent para dichlorobenzene, was placed in a reaction vessel similar to that of Example 1. In addition to the dichlorobenzene mixture, 3.37 moles of aluminum chloride were also placed in the reaction vessel. Stirring was commenced and heat was applied to increase the temperature of the reaction mixture to 75 degrees centigrade. To the heated mixture, 2.7 moles of acetyl chloride were added dropwise over a period of about one hour. The reaction temperature was maintained at 75 degrees centigrade for an additional two hours, after which the reaction mixture was poured onto ice and separated as in Example 1. 2′,4′-dichloroacetophenone was recovered by distilling under a pressure of 15 millimeters of mercury and at 127 degrees centigrade.

The reaction was effected on a dichlorobenzene mixture containing 6.9 moles of metadichlorobenzene. Based on the acetyl chloride used, the yield of 2′,4′-dichloroacetophenone was 86.5 percent. The purity of the 2′,4′-dichloroacetophenone in the product was greater than 90 percent.

*Example 3*

The reaction of Example 2 was repeated using similar amounts and proportions of dichlorobenzene and acetyl chloride. However, the reaction temperature was 130 degrees centigrade. At this temperature the reaction was effected in about one hour. The yield of 2′,4′-dichloroacetophenone based on the acetyl chloride used was 76.5 percent. The amount of 2′,4′-dichloroacetophenone based on the total dichloroacetophenone in the reaction mixture was 82 percent.

*Example 4*

2′,4′-dichloroacetophenone was prepared by reaction of a crude mixture of dichlorobenzene with acetic anhydride. A mixture of 9.85 moles of dichlorobenzene containing 71 percent meta, 6.3 percent ortho and 22 percent para-dichlorobenzene, and 6.7 moles of AlCl₃ were placed in a reaction vessel similar to that of Example 1. Stirring was commenced and heat was applied to increase the temperature of the reaction mixture to 130 degrees centigrade. To the heated mixture, 2.7 moles of acetic anhydride were added dropwise over a period of about one-half hour. The reaction mixture was maintained at a temperature of about 130 degrees centigrade for a total of 1½ hours from the commencement of the acetic anhydride addition. Subsequently, the reaction mixture was poured onto ice and separated an in Example 1. A product was recovered by distillation having a boiling point of 127 degrees centigrade under a pressure of 15 millimeters of mercury. The product was analyzed by infrared comparison to authenticate 2′,4′-dichloroacetophenone and found to have a purity of 85 percent. The yield was 86.5 percent based on the acetic anhydride charged to the reaction mixture.

In a like manner, beta, beta, 2′,4′-tetrachloroacetophenone and beta, beta, beta, 2′,4′-pentachloroacetophenone can be from the respective di and trichloroacetyl chloride and similar acetic anhydrides by reaction with a crude mixture of dichlorobenzene containing 20 to 85 percent metadichlorobenzene isomers. Also, other Lewis acid catalysts effect the reaction when used in an amount at least equimolar to that of the acetylating reagent. Other halo substituents such as fluorine, bromine and iodine can be used in place of chlorine to produce the respective halo compound.

While there have been described various embodiments of the invention, the methods described are not intended to be understood as limiting the scope of the invention, as it is realized that changes therein are possible. It is further intended that each element recited in any of the following claims is to be understood as referring to all the equivalent elements for accomplishing substantially the same results in substantially the same or equivalent manner. It is intended to cover the invention broadly in whatever form its principles may be utilized.

What is claimed is:

1. A process for the production of the group consisting of 2',4' dichloroacetophenone and beta-polychlorinated 2',4' dichloroacetophenone in a proportion exceeding the proportion of metadichlorobenzene in a dichlorobenzene starting mixture comprising reacting a mixture of dichlorobenzenes containing from 20 to 85 percent metadichlorobenzene isomer with an acetylating reagent selected from the group consisting of acetyl chloride, acetic anhydride, dichloroacetyl chloride, trichloroacetyl chloride, dichloroacetic anhydride and trichloroacetic anhydride, said acetylating reagent being used in an amount up to the stoichiometric equivalent based on the amount of metadichlorobenzene in the reaction mixture and effecting the reaction in the presence of a Lewis-acid catalyst.

2. The process of claim 1 wherein the acetylating reagent is acetyl chloride and the catalyst is aluminum chloride.

3. A process of claim 1 wherein the acetylating reagent is acetic anhydride and the catalyst is aluminum chloride.

4. The process of claim 1 in which the acetylating reagent is dichloroacetyl chloride and the catalyst is aluminum chloride.

5. The process of claim 1 wherein the acetylating reagent is dichloroacetic anhydride and the catalyst is aluminum chloride.

6. A process for the production of the group consisting of 2',4' dichloroacetophenone and beta-polychlorinated 2',4' dichloroacetophenone in a proportion exceeding the proportion of metadichlorobenzene in a dichlorobenzene starting mixture comprising reacting a mixture of dichlorobenzenes containing 20 to 85 percent metadichlorobenzene isomer with an acetylating reagent selected from the group consisting of acetyl chloride, acetic anhydride, dichloroacetyl chloride, dichloroacetic anhydride, trichloroacetyl chloride and trichloroacetic anhydride, said acetylating reagent being used in an amount up to the stoichiometric equivalent based on the amount of metadichlorobenzene in the reaction mixture and effecting the reaction in the presence of at least an equimolar amount of Lewis-acid catalyst based on the amount of acetylating reagent.

7. The method of claim 6 wherein the reaction is effected at a temperature in the range of 20 degrees centigrade to 200 degrees centigrade.

8. A process for the production of the group consisting of 2',4' dichloroacetophenone and beta-polychlorinated 2',4' dichloroacetophenone in a proportion exceeding the proportion of metadichlorobenzene in the dichlorobenzene starting mixture comprising reacting dichlorobenzene containing 40 to 75 percent metadichlorobenzene isomer with an acetylating reagent selected from the group consisting of acetyl chloride, acetic anhydride, dichloroacetyl chloride, trichloroacetyl chloride, dichloroacetic anhydride and trichloroacetic anhydride at a temperature of 40 degrees centigrade to 130 degrees centigrade, said acetylating reagent being used in an amount up to the stoichiometric equivalent based on the amount of metadichlorobenzene in the reaction mixture, in the presence of at least an equimolar amount of aluminum chloride based on the amount of acetylating reagent.

9. A process for the production of 2',4'-dichloroacetophenone in a proportion exceeding the proportion of metadichlorobenzene in the dichlorobenzene starting mixture comprising reacting dichlorobenzene containing 40 to 75 percent metadichlorobenzene isomer with acetyl chloride at a temperature of 40 to 130 degrees centigrade, said acetyl chloride being reacted in an amount up to the stoichiometric equivalent based on the amount of metadichlorobenzene in the reaction mixture, the reaction being effected in the presence of 1 to 3 moles of aluminum chloride per mole of acetyl chloride.

References Cited
UNITED STATES PATENTS 2,666,085   1/1954   Fitzpatrick _____ 260—650

DANIEL D. HORWITZ, Primary Examiner.

BERNARD HELFIN, Examiner.